Oct. 9, 1923.  
F. SCHAEFER  
CONNECTING ROD  
Filed July 19, 1920  
1,470,120
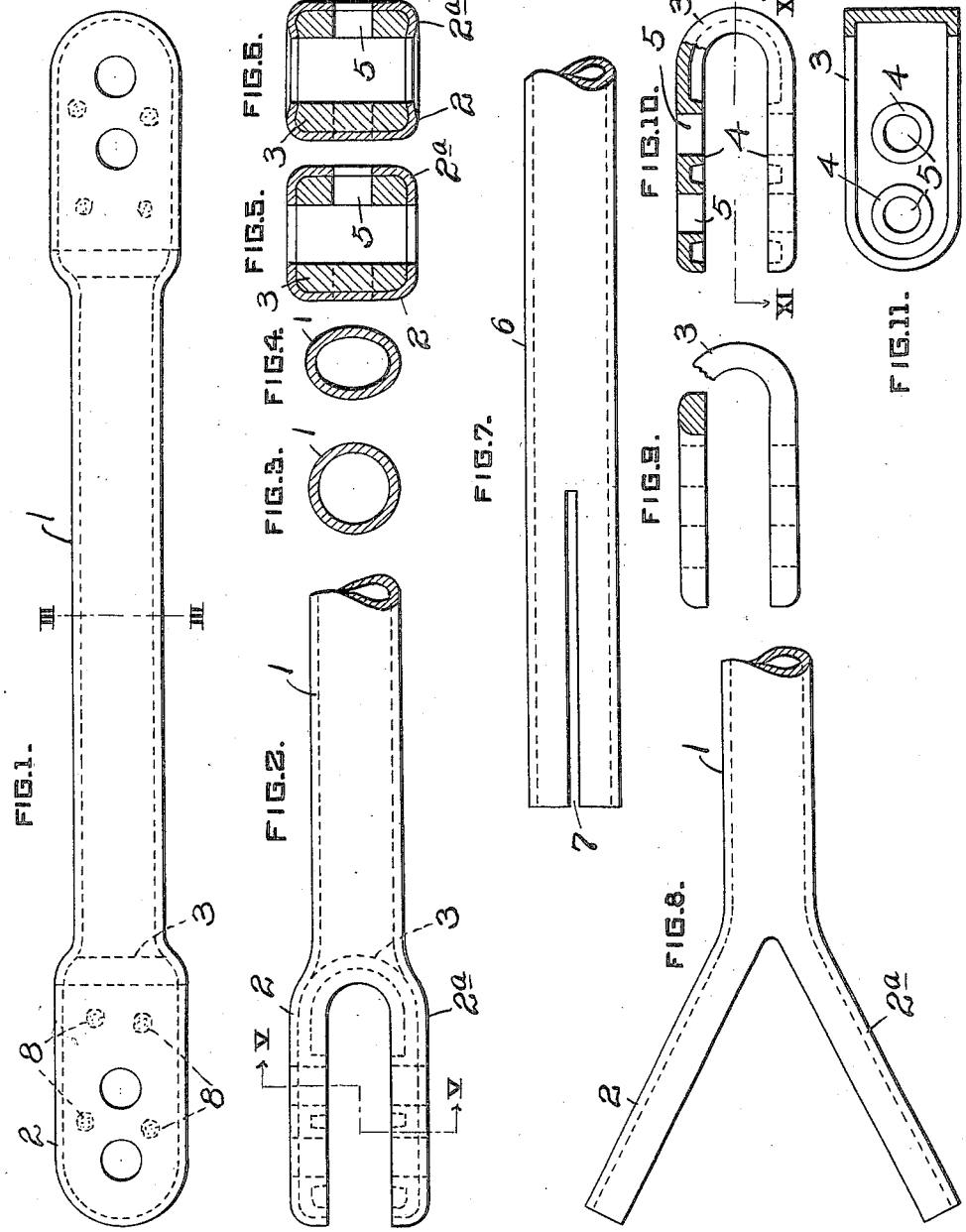
WITNESSES  
J. Herbert Bradley
INVENTOR  
Frederic Schaefer  
by Winter & Brown  
his attorneys Patented Oct. 9, 1923.

1,470,120

UNITED STATES PATENT OFFICE.

FREDERIC SCHAEFER, OF PITTSBURGH, PENNSYLVANIA.

CONNECTING ROD.

Application filed July 19, 1920. Serial No. 397,473.

*To all whom it may concern:*

Be it known that I, FREDERIC SCHAEFER, a resident of Pittsburgh, in the county of Allegheny and State of Pennsylvania, have invented a new and useful Improvement in Connecting Rods, of which the following is a specification.

The invention relates to connecting rods of general applicability, but has particularly to do with connecting rods for brake gears used in railway cars and passenger coaches.

The object of the invention is to provide a connecting rod which will be light in weight, structurally strong and rigid, and which may be economically manufactured.

The invention is illustrated in the accompanying sheets of drawings, which form part of this specification. Fig. 1 is a side view of the connecting rod; Fig. 2 a plan view of a portion thereof; Fig. 3 a transverse sectional view taken on the line III—III, Fig. 1, showing one form of the body portion; Fig. 4 a view similar to Fig. 3 showing a modification in form of body construction; Fig. 5 a sectional view taken on the broken line V—V, Fig. 2; Fig. 6 a view similar to Fig. 5, showing a modification of construction; Fig. 7 a side view of one end of a blank in the course of manufacture of the connecting rod; Fig. 8 a view similar to Fig. 7 showing the blank after having passed through another step in the manufacture; Figs. 9 and 10 combined plan and sectional views of alternate forms of yokes; and Fig. 11 a sectional view taken on the line XI—XI, Fig. 10.

The connecting rod constructed according to the invention includes a tubular body and a fork head, the head comprising a divided prolongation of the tubular body and having a reinforcing yoke arranged within and attached to such prolongation.

The rod illustrated in the drawings is provided with two forked heads or ends of like construction and hence the description thereof will be confined to an explanation of the construction and manner of forming one head.

The tubular body portion 1 of the connecting rod may be of various desired cross sectional shapes, as for example, of the cylindrical form illustrated in Fig. 3 or the oblong or elliptical form indicated in Fig. 4. As shown particularly in Fig. 2, the forked end of the rod preferably consists of oppositely disposed outer sections 2 and $2^a$ formed as prolongations of the body 1. Within, and engaged by, the sections 2 and $2^a$ there is arranged a yoke 3 which adds strength and rigidity to the forked end of the rod, and which affords metal for proper bearings for the pins used in attaching the connecting rod to a desired structure or element.

The yoke may be of the general semi-cylindrical form as illustrated in Fig. 9, but is preferably forged or otherwise shaped into irregular form for the purpose of making it as light as possible commensurate with the required strength. An irregularly shaped light-weight yoke is illustrated in Figs. 10 and 11, the central portion of the yoke being of channel shape in cross section, and the ends thereof being provided with annular flanges 4 surrounding the eyes 5.

Each end or head of the connecting rod may be provided with any desired number of eyes 5, that shown herein having two eyes extending through the sections 2 and $2^a$ and through the adjacent portions of the yoke.

While the connecting rod may be variously manufactured, it is preferred to construct it in the following manner: A tube 6, Fig. 7, of desired form and thickness of wall, is provided at its ends with oppositely disposed slots 7 of lengths depending upon the size of the head to be formed. These slots may be suitably formed with a rotary disc-shaped cutter. The sections 2 and $2^a$ are then spread laterally to substantially the degree of divergence illustrated in Fig. 8, this being done by a wedge-shaped expanding tool inserted in the end of the tube while the latter is firmly gripped adjacent to the inner ends of the slots 7.

In the next step of the operation the yoke 3 is inserted between the spread sections 2 and $2^a$ and the sections are bent toward each other and into engagement with the outer faces and ends of the yoke. This may be done in a forming press in which the yoke 3, suitably held against being closed by pressure, forms a mandrel for shaping the sections to the contour of its outer faces. As shown in Fig. 5 the sides and ends of the yoke may lie in planes substantially at right angles to the general plane of the yoke opening, or, as shown in Fig. 6, such sides may converge so that the edges of the sections 2 and $2^a$ will overhang the widest portions of the yoke body, the latter construction affording a better connection between said sections and yoke. If desired, the sections may be suitably spot welded to the yoke, as illustrated at 8, Fig. 1. The eyes 5 may be formed in the head after the sections 2, 2ª have been clamped upon the yokes, or simultaneously therewith.

The connecting rod so constructed is exceedingly strong and very light in weight. Furthermore, the yoke which reinforces the head affords metal for adequate bearings for connecting pins, the stress between a connecting pin and the eyes formed in the yoke being properly transmitted to the side sections 2 and 2ª by reason of the firm engagement of these sections with the sides and ends of the yoke.

I claim:

1. A connecting rod formed throughout of an integral tube of substantially uniform wall thickness, the rod having a tubular body and a forked head, the head comprising a divided and laterally spread prolongation of said body, and a reenforcing yoke arranged within and rigidly attached to the forked head.

2. A connecting rod formed throughout of an integral tube of substantially uniform wall thickness, the rod having a tubular body and a forked head having two tines, the head comprising a medially divided and laterally spread prolongation of said body, a substantially U-shaped reenforcing yoke arranged within the tines of the head, and the tines of the head having flanges firmly embracing said yoke.

3. A connecting rod formed throughout of an integral tube of substantially uniform wall thickness, the rod having a tubular body and a forked head having two tines, the head comprising a divided and laterally spread prolongation of said body, a yoke arranged between and rigidly attached to the tines of said head, and the tines and yoke being provided with pin holes, the yoke forming a reenforcement for the tines and increased bearing area for connecting pins.

In testimony whereof, I have hereunto set my hand.

FREDERIC SCHAEFER.

Witnesses:
G. G. TRILL,
PAUL N. CRITCHLOW.